UNITED STATES PATENT OFFICE.

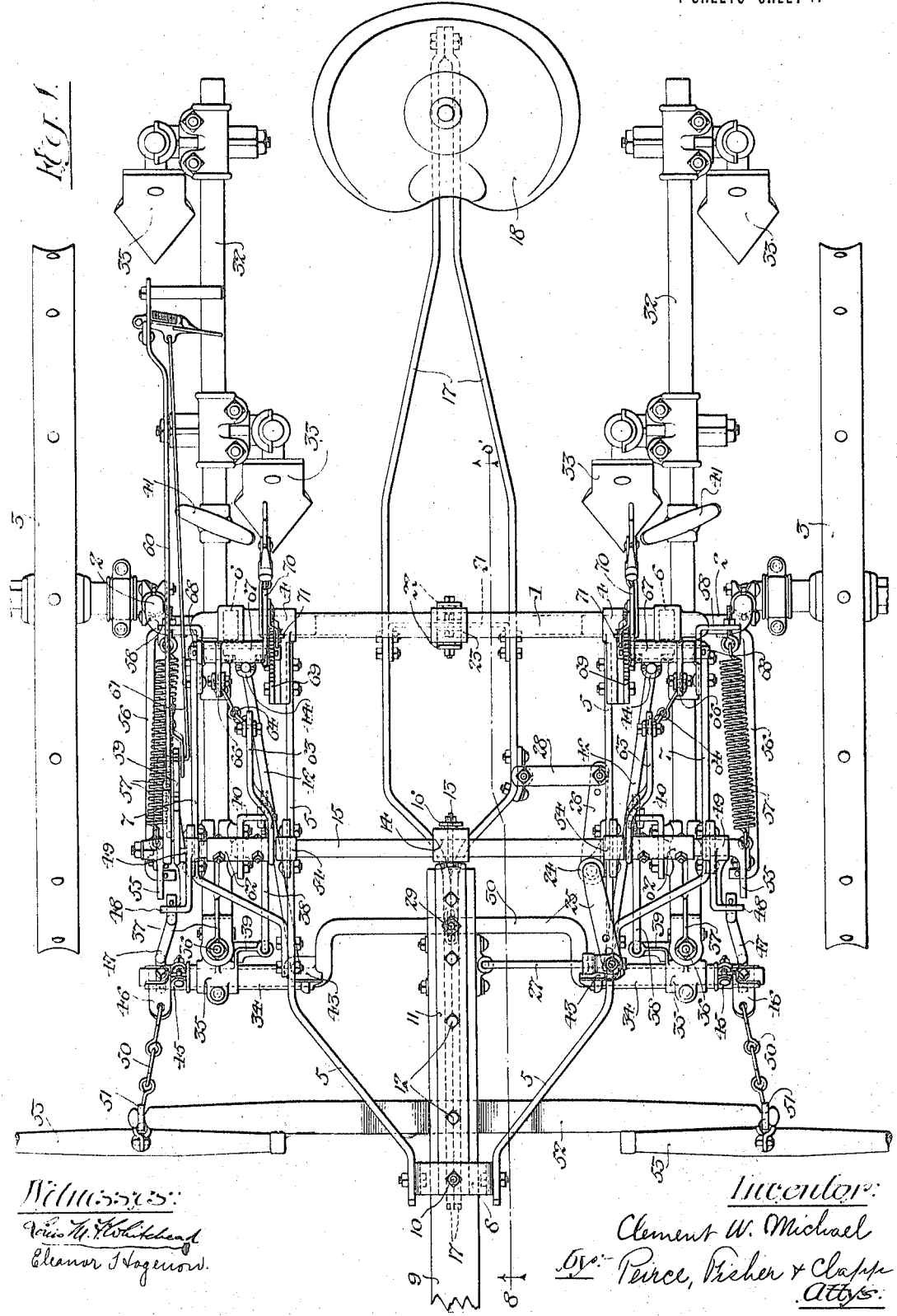

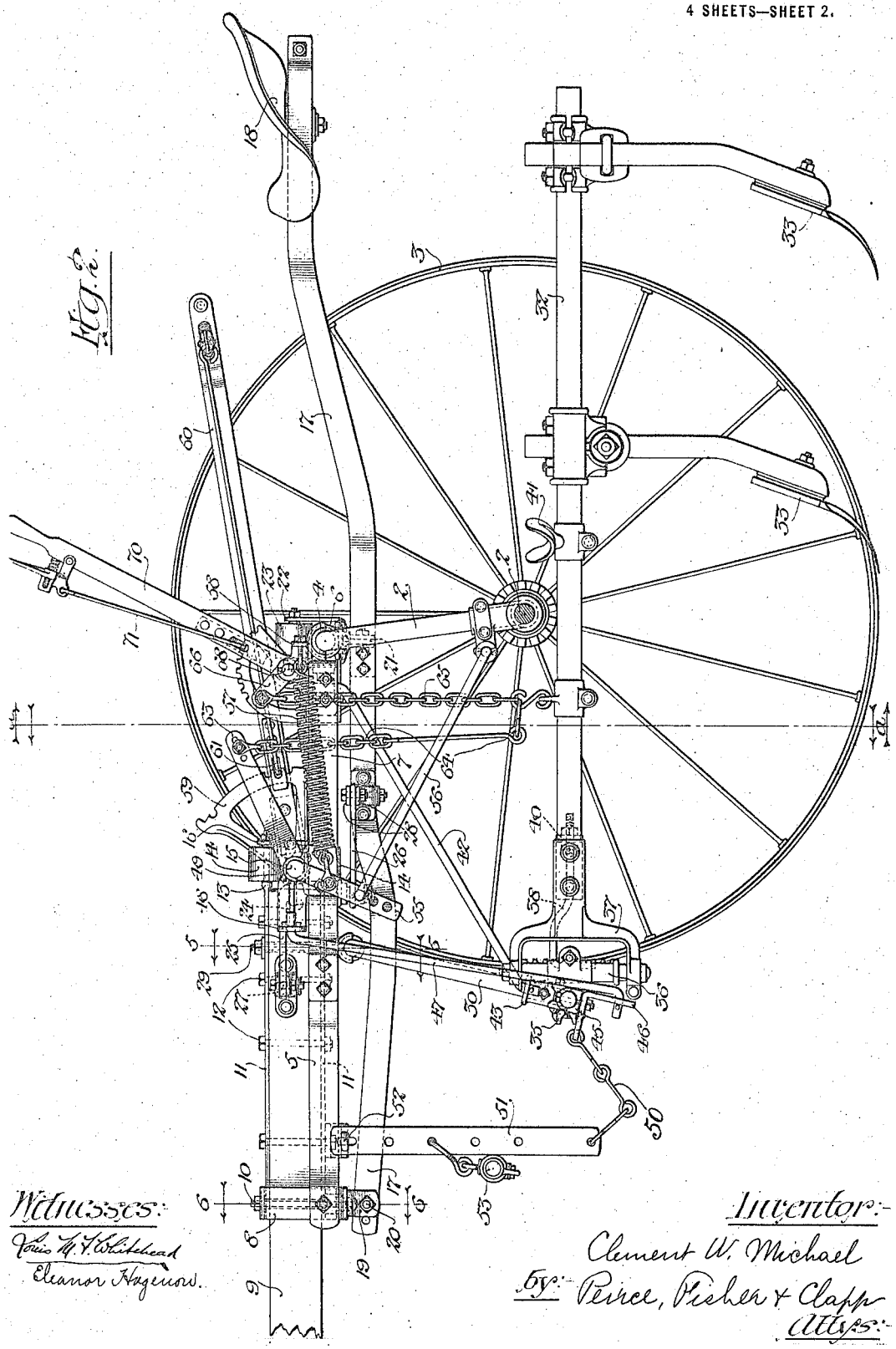

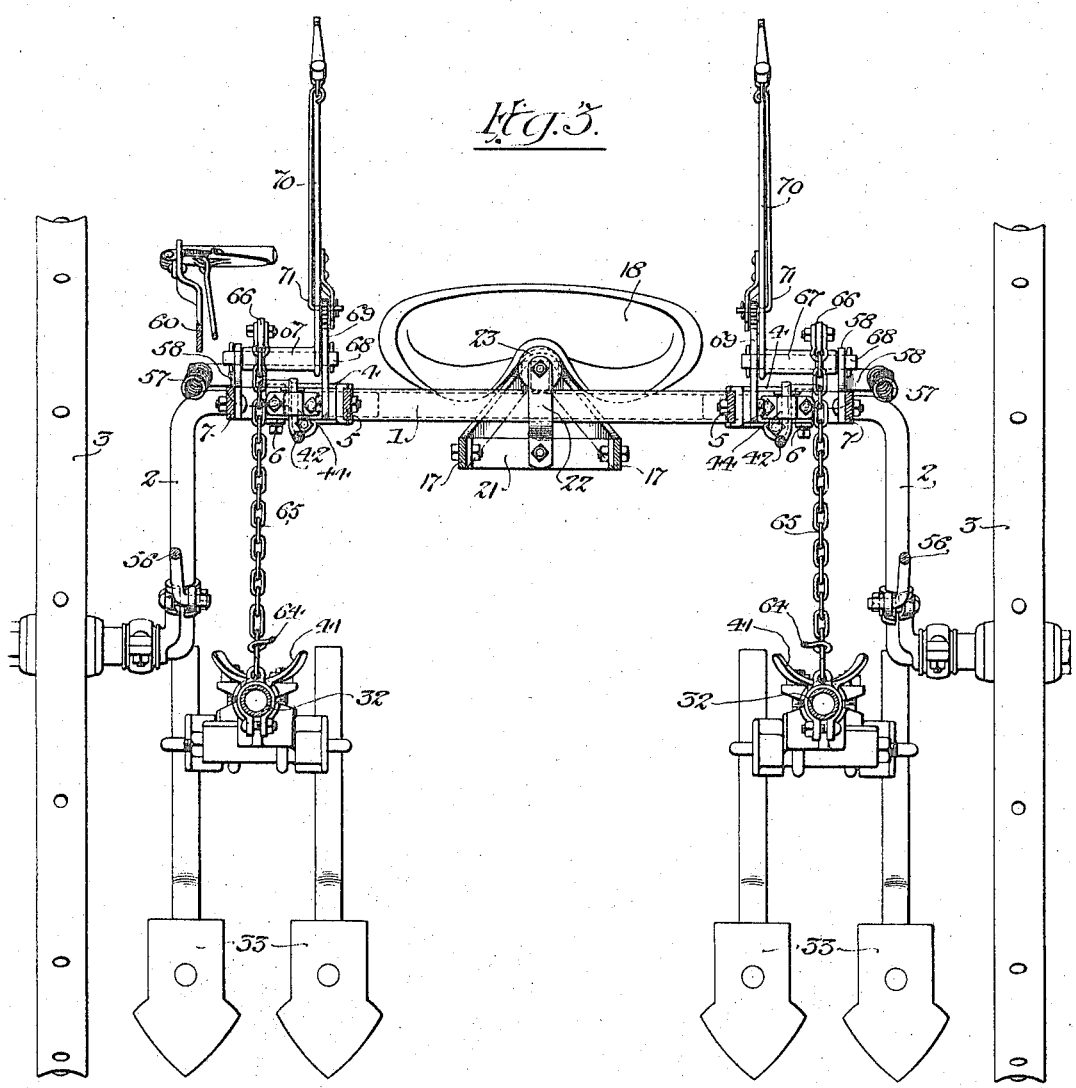

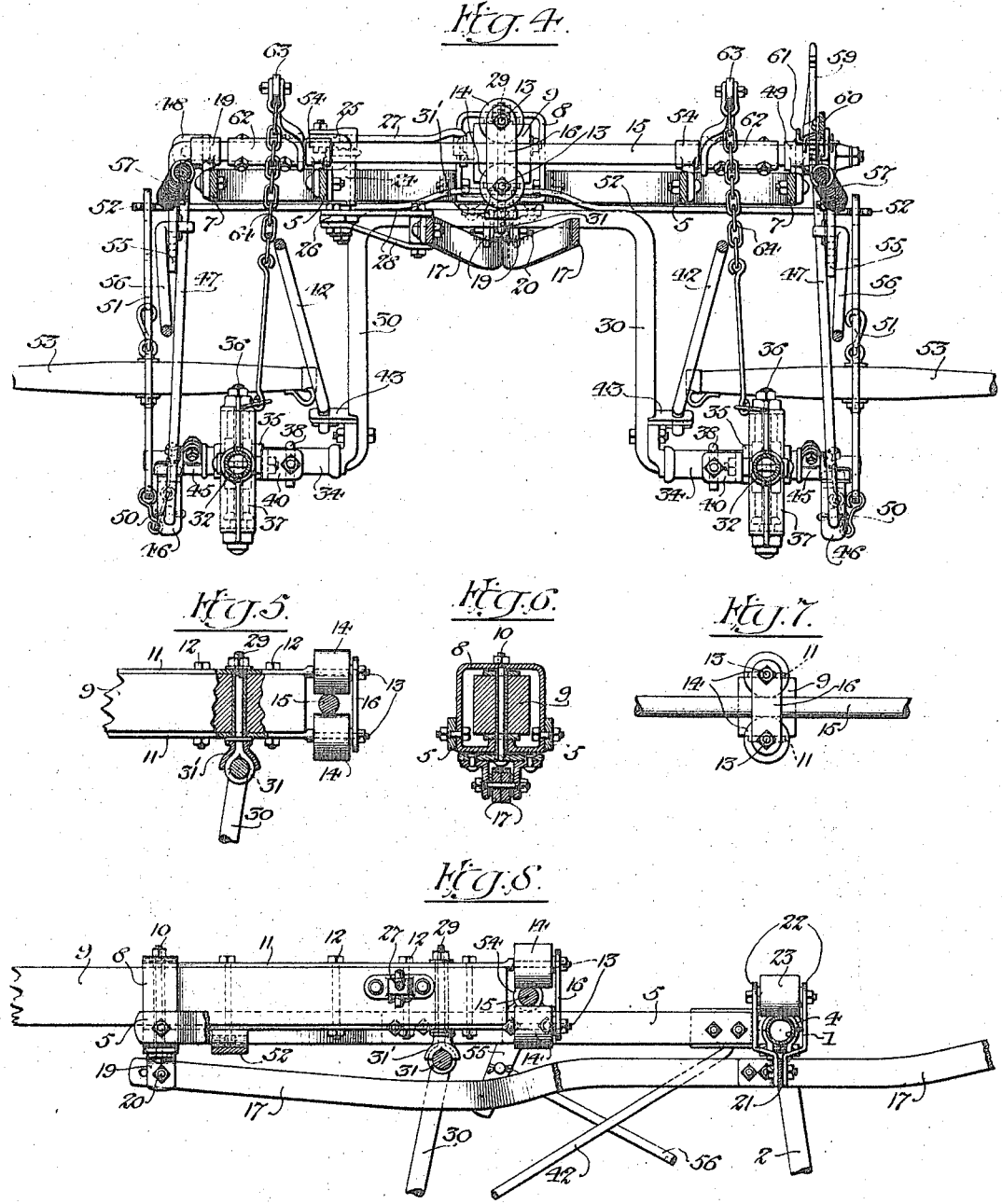

CLEMENT W. MICHAEL, OF RACINE, WISCONSIN, ASSIGNOR TO J. I. CASE PLOW WORKS, OF RACINE, WISCONSIN, A CORPORATION.

CULTIVATOR.

1,141,135.     Specification of Letters Patent.     Patented June 1, 1915.

Application filed October 14, 1912. Serial No. 725,716.

*To all whom it may concern:*

Be it known that I, CLEMENT W. MICHAEL, a citizen of the United States, and a resident of Racine, county of Racine, and State of Wisconsin, have invented certain new and useful Improvements in Cultivators, of which the following is a full, clear, and exact description.

The invention relates to wheeled cultivators and seeks to provide an improved construction in which a laterally swinging or pivoted seat bar coöperates with a laterally swinging or pivoted pole to steer or guide the cultivator frame and gangs carried thereby on one side or the other.

The invention consists in the features of improvement hereinafter set forth, illustrated in the preferred form in the accompanying drawings and more particularly pointed out in the appended claims.

In the drawings, Figure 1 is a plan view of the improved cultivator. Fig. 2 is a side elevation with the rear wheel removed. Fig. 3 is a section on the line *a—a* of Fig. 2 looking toward the rear of the machine. Fig. 4 is a section on the line *a—a* of Fig. 2 looking forwardly. Figs. 5 and 6 are detail sections on the lines 5—5 and 6—6, respectively of Fig. 2. Fig. 7 is a view in elevation of the parts shown in Fig. 5. Fig. 8 is a detail section on the line 8—8 of Fig. 1.

The cultivator is provided with an arched axle comprising an upper, horizontal, tubular section 1 and depending wheel sections 2 whereon the wheels 3 are mounted. The tubular section 1 of the arched axle forms, in effect, the rear bar of the cultivator frame and is connected at its ends to cast metal brackets 4, the inner ends of which are connected to the rear ends of the main side bars 5 of the frame. The wheel sections 2 of the arched axle are laterally adjustable within the ends of the tubular section or rear frame bar 1 to vary the distance between the wheels. They are held in adjusted position and against lateral movement by collars 6 arranged in suitable seats in the outer ends of the castings 4, the arrangement being such that the wheel sections can be swung forward and back as the cultivator gangs are raised and lowered. Outer supplemental side bars 7 are connected at their rear ends to the brackets 4 and the forward, inwardly offset ends thereof are connected to the main side bars 5. The forward ends of the latter are inclined inwardly and forwardly and are fixed to the opposite sides of a rectangular yoke 8 through which the pole 9 extends. The pole 9 is pivotally connected in front of its rear end to the yoke 8 by a vertical pivot bolt 10 (see Fig. 6) so that the pole may be swung from side to side to angle the cultivator frame and guide it in lateral direction. A pair of metal strips 11 are secured by bolts 12 to the upper and lower faces of the rear portion of the pole. These strips are provided with extensions which project beyond the rear end of the pole and which are in sliding engagement with a portion of the frame to hold the swinging pole in proper position. In the preferred form shown, the extensions or spindles 13 on the rear end of the strips 11 are provided with anti-friction rollers 14 which engage the upper and lower faces of a transverse rock shaft 15. A brace or strap 16 connects the extreme rear ends of the spindles 13, as most clearly shown in Figs. 5 and 7. The pole is shifted to angle the frame relatively thereto by a swinging seat bar which is pivotally mounted at its forward end and suitably connected to the rear end of the pole to shift the latter in one direction as the seat is shifted or swung in the opposite direction. In the preferred form shown, the seat bar comprises two members 17 which are spaced apart throughout the greater portion of their length. The double or twin members 17 of the seat bar are arranged adjacent each other at their rear ends and carry a seat 18. The members extend forwardly from the seat beneath the rear frame bar or tubular axle section 1 and beneath the rear end of the tongue. The forward ends of the members of the seat bars are connected and pivotally mounted adjacent the pivot point of the tongue. In the preferred form shown, the bolt 10 upon which the pole is pivoted also serves as the pivot of the swinging seat bar. As most clearly shown in Fig. 6, a U-shaped piece 19 pivotally mounted on the lower end of the bolt 10 is connected to the forward ends of the seat bar members 17 by a transverse bolt 20. The seat bar has a sliding connection or is supported by the frame intermediate its ends. In the construction shown, a cross piece 21 (see Fig. 3) extends between the members 17 of the seat bar beneath the tubular frame bar 1. Links 22 connected to the cross bar 21 extend upwardly therefrom on opposite sides of the rear frame bar 1 and carry an anti-friction roller 23 which rests upon the rear frame bar. A lever is journaled to swing upon a vertical axis in a bracket 24 (see Fig. 1) on one side of the frame opposite the rear end of the pole. This lever is provided with an upper forwardly extending arm 25 and a lower rearwardly extending arm 26. The upper arm 25 is connected to the rear end of the pole by a link 27 and the lower arm is connected to the seat bar at a point intermediate the ends of the latter by links 28. A series of holes are preferably provided in the arms 25 and 26 so that the connections between these arms and the links 27 and 28 can be adjusted, as desired, to vary the throw. When the operator shifts the seat to one side, the connections between the seat bar and the pole will shift the rear end of the latter and the forward end of the frame in the opposite direction, so that the frame will be angled relatively to the pole and will be guided or steered laterally. The rear end of the pole is connected by a vertical pivot bolt 29 to the upper portion of a front arch 30, the lower end of the bolt being provided with an eye 31 (see Fig. 5) through which the upper portion of the front arch bar 30 extends. A cast piece 31' fits over the upper portion of the eye 31 and engages the arch bar and clamps these parts together when the nut on the upper end of the bolt 29 is tightened. The cultivator beams 32 carrying the shovels 33 are mounted upon the lower, horizontal end portions of the front arch. In the form shown, sleeves 34 are journaled upon the lower horizontal end portions of the front arch and coupling brackets 35 are adjustably clamped thereon. Vertically adjustable spindles 36 are clamped to the couplings 35 and yokes 37 on the forward ends of the beams 32 engage the ends of the spindles. The cultivator beams are free to swing upon the ends of the front arch to and from working position, but are normally held against lateral swinging movement by links 38 (see Figs. 1 and 4) which extend between lugs 39 on the coupling brackets 35 and clips 40 secured to the sides of the beams. These connections hold the cultivator gangs against lateral swinging movement about the vertical spindles 36, but preferably, the links 38 are adjustably connected to the clips 40, so that the position of the cultivator beams can be adjusted.

The cultivator beams 32 are provided with stirrups 41 for the rider's feet, so that he may shift the rear end of the seat bar by pushing upon one or the other of the cultivator beams. As the rear end of the tongue or pole is shifted in one or the other direction, the front arch which is connected thereto by the bolt 29, is also shifted laterally and carries the gangs connected to the front arch to one side or the other. To brace the ends of the laterally shifting front arch, a pair of links 42 are pivotally connected at their lower forward ends to brackets 43 (see Figs. 2 and 4), fixed to the lower end portions of the arch adjacent the inner ends of the sleeves 34. The upper rear ends of these links pivotally engage suitable brackets 44 (see Figs. 1 and 3) secured to the rear end portions of the cultivator frame. These swinging links diverge outwardly and rearwardly from the ends of the front arch so that the gangs are maintained in a position parallel to the line of draft as the rear end of the pole and the front arch is shifted to one side or the other.

Clips 45 are clamped upon the outer ends of the lower horizontal spindles of the front arch, and a pair of angle pieces 46 are secured thereto. Additional brace links 47 are pivotally connected at their lower ends to the angle pieces 46 and at their upper ends to a pair of arms 48 which extend forwardly from brackets 49 on the outer or supplemental frame bars 7. The two sets of swinging links 42 and 47 securely brace the ends of the swinging front arch which carry the gangs. The angle pieces 46 are connected by chains 50 to the lower ends of a pair of draft bars 51. The upper ends of these draft bars engage a whiffle-tree 52 which is pivotally connected to the pole 9. Swingle-trees 53 are connected to the draft arms 51.

The cross shaft 15 is journaled at its ends in the brackets 49 and is also journaled in brackets 54 fixed to the main side bars 5. The ends of the shaft are provided with depending arms 55 which are connected by links 56 to the lower ends of the depending wheel sections 2 of the arched axle. These arms are also connected by lift springs 57 to a pair of clips 58 fixed to the rear ends of the outer supplemental side bars 7. The bracket 49 on one side of the machine is provided with a notched segment 59 and a lever 60 fixed to the adjacent end of the shaft 15 is provided with a dog 61 arranged to engage the notched segment and hold the shaft 15 in adjusted position. Between the pairs of brackets 49 and 54, the shaft 15 is provided with sleeves 62 having upwardly and rearwardly projecting arms 63 extending therefrom. These arms are connected by depending chains 64 to the cultivator beams 32. By shifting the lever 60 in opposite directions, the cultivator beams are raised and lowered and the wheel sections of the arched sections are swung forwardly and back to balance the cultivator when the gangs are raised. By this arrangement, the forward draft of the team aids in lifting the cultivator gangs from working position. The cultivator beams are also connected by a chain 65 to a pair of arms 66. These arms are mounted upon hubs 67 (see Figs. 1 and 3) and these hubs are carried on spindles 68 which extend through the clips 58 and through notched segments 69 fixed to the rear ends of the main frame bars 5. Levers 70 fixed to the hub 67 are provided with dogs 71 arranged to engage the segments 69 and hold the levers in adjusted position. These depth regulating levers 70 are independent of the main raising and lowering lever 60, but inasmuch as the levers are connected to the gangs by flexible chain connections, the lever 60 can be properly operated to raise and lower the same simultaneously and the levers 70 can be actuated to independently adjust the working depth thereof, the operation of the depth regulating levers being independent of that of the main raising and lowering lever. Furthermore the flexible chains uphold the rear ends of the gangs but do not interfere with the lateral shift thereof when the pole and frame are angled by the seat bar.

It should be noted that the swinging brace links 42 and 47 extend between the front arch and the main frame, so that the depending sections of the wheel axle are free to swing with the main raising and lowering shift lever to balance the cultivator when the gangs are raised and so that the draft of the team may be utilized in raising the gangs.

By pivoting the seat bar at a point near the front of the machine, the lateral swing of the seat at its rear end, necessary to guide the cultivator, is approximately in a straight transverse direction and the rider's body is not twisted when the seat is moved. By forming the seat bar of separate members spaced apart, the rider has a full view of the row of plants over which the cultivator travels, and he can readily guide the gangs in proper relation to the plants by swinging the seat to one side or the other and pushing the gangs in the opposite direction. At the same time, his hands are free to guide the team.

It is obvious that changes may be made in the details set forth without the departure from the essentials of the invention as defined in the claims.

I claim as my invention:—

1. In a cultivator, the combination with a frame, of a pole pivoted in front of its rear end to said frame, a seat bar pivoted at its forward end to the forward end of said frame, and connections between the rear end of said pole and said seat bar.

2. In a cultivator, the combination with a frame, of a pole pivoted thereto, a front arch connected to said pole, cultivator gangs connected to said front arch, a laterally swinging seat bar pivotally mounted at its forward end upon the forward part of said frame and having a sliding connection with said frame intermediate its ends, and connections between said seat bar and said pole for swinging the frame and gangs to one side or the other.

3. In a cultivator, the combination with a frame, of a pole pivoted thereto, a front arch connected to said pole, cultivator gangs connected to said front arch, a laterally swinging seat bar pivotally mounted at its forward end and having a sliding connection with said frame intermediate its ends, and operating connections extending from between the ends of said seat bar to the rear end of said pole.

4. In a cultivator, the combination with a wheel-supported frame, of a pole pivoted thereto in front of its rear end, a laterally swinging seat bar pivotally mounted at its forward end and having a sliding connection between its ends with said frame, and connections between said seat bar and the rear end of said pole for swinging the latter in one direction when the seat bar is shifted in the opposite direction.

5. In a cultivator, the combination with a wheel-supported frame, of a pole pivoted thereto in front of its rear end, a laterally swinging seat bar pivotally mounted at its forward end and having a sliding connection between its ends with said frame, a swinging lever on the frame and links connecting said lever to the rear end of the pole and to said seat bar respectively.

6. In a cultivator, the combination with a wheel-supported frame, of a pole pivoted thereto in front of its rear end, a laterally swinging seat bar pivotally mounted at its forward end and having a sliding connection between its ends with said frame, a front arch pivotally connected to the rear end of said pole, gangs connected to said arch, links pivoted to said arch, diverging rearwardly therefrom and pivoted at their rear ends to said frame, and operating connections extending from between the ends of said seat bar to the rear end of said pole.

7. In a cultivator, the combination with a wheel-supported frame, of a pole pivoted thereto in front of its rear end, a laterally swinging seat bar pivotally mounted at its forward end and having a sliding connection between its ends with said frame, a front arch pivotally connected to the rear end of said pole, gangs connected to said arch, links pivoted to said arch, diverging rearwardly therefrom and pivoted at their rear ends to said frame, a swinging lever on one side of the frame, a link pivoted to said lever and to said seat bar at a point between its ends, and a second link connecting said lever to the rear end of said pole.

8. In a cultivator, the combination with a wheel-supported frame, of a pole pivoted thereto in front of its rear end and having a sliding connection with said frame at its rear end, a seat bar pivoted at its forward end to the forward part of said frame and having a sliding connection therewith intermediate its ends, a swinging double-armed lever on said frame and links connecting the opposite arms of said lever to said pole and said seat bar respectively.

9. In a cultivator, the combination with a wheel-supported frame, of a swinging pole and a seat bar pivotally connected at its forward end directly to the forward end of the frame, operating connections between said seat bar and said pole for angling the frame, and a seat on the rear end of said bar, said seat bar comprising two members spaced in front of said seat and having a sliding connection with the rear part of the frame.

10. In a cultivator, the combination with a wheel-supported frame, of a pivoted pole, a bar connected to said frame and pole for angling said frame relatively to said pole, a front arch bar connected to said pole, cultivator beams connected to said arch bar, and two pairs of swinging links connecting the ends of said arch bar to the front and rear portions respectively of said frame.

11. In a cultivator, the combination with a wheel-supported frame, of a pivoted pole, a bar connected to said frame and pole for angling said frame relatively to said pole, a front arch bar connected to said pole, cultivator beams connected to said arch bar, a pair of swinging links connected to the ends of said arch bar and extending upwardly therefrom to said frame, and a second pair of swinging links connected to the ends of said arch bar, diverging upwardly and rearwardly therefrom and connected to the rear side portions of said frame.

12. In a cultivator, the combination with a frame, of an arched axle having swinging wheel-sections, a pivoted pole, a steering bar connected to said frame and said pole, a front arch bar connected to said pole, cultivator beams connected to said arch, a rock shaft on the frame connected to said beams, an operating lever for said rock-shaft, links connecting the wheel-sections of said arched axle to said rock shaft, and swinging brace links connecting said front arch to said frame.

13. In a cultivator, the combination with a wheel supported frame, of a pole and an adjusting bar pivotally connected to the forward part of said frame in front of the rear end of the pole, the latter having a sliding connection at its rear end with said frame, and connections between said adjusting bar and the rear end of the pole for angling the frame relatively to said pole.

14. In a cultivator, the combination with a wheel supported frame, of a pole and an adjusting bar pivoted at the forward part of said frame in front of the rear end of the pole, the latter having a sliding connection at its rear end with said frame, a front arch connected to the rear end of the pole, cultivator beams connected to said front arch, links connecting said arch to said frame, a lever pivoted at one side of said frame, and links connecting said lever to the rear end of the pole and to said adjusting bar.

CLEMENT W. MICHAEL.

Witnesses:
   STANLEY A. BREWER,
   EDWARD E. WILLIAMS.